July 7, 1959

R. A. ROSER ET AL 2,893,332

SEASONING APPLICATOR

Filed Aug. 30, 1956

INVENTORS
Robert A. Roser and
Everett H. Hedin
BY McCanna and Morsbach
ATTORNEYS

United States Patent Office 2,893,332
Patented July 7, 1959

2,893,332

SEASONING APPLICATOR

Robert A. Roser and Everett W. Hedin, Hopkins, Minn., assignors to Dell Foods Specialties Co., Beloit, Wis., a corporation of Wisconsin Application August 30, 1956, Serial No. 607,145

15 Claims. (Cl. 107—54)

This invention relates to seasoning applicators and more particularly to an improved method and apparatus for applying powdered seasoning to pieces of light weight food products such as potato chips, pop corn and the like.

Food products such as potato chips, pop corn and the like are frequently seasoned after preparation and before packaging. In the commercial production of such food products, the food products are generally carried on a continuous conveyer from the producing apparatus past the seasoning apparatus to the packaging apparatus. Although the rate of production of the food product varies, the pieces of food products on the conveyer are frequently in a layer several times deeper than the individual pieces. It has heretofore been the practice to sprinkle seasoning on the layer of food products as it is carried on the conveyor. This was not entirely satisfactory since the pieces of food product were generally seasoned only on the upper side thereof and, when the layer of food pieces on the conveyer was several times deeper than the individual pieces, some of the food pieces were not seasoned at all.

Some seasonings, such as powdered barbecue flavored seasoning, are relatively pungent and sharp to the taste and the presence or absence of such seasonings on each piece of food product, and even the non-uniform application of such seasonings on each piece, materially affects the taste of the food product. It is, therefore, a desideratum to coat each piece on all sides thereof with a controlled thin coating of seasoning in order to produce a commercially satisfactory product. However, these pieces of food products are frequently irregularly shaped and, moreover, are delivered from the processing apparatus at a rapid rate and frequently in a layer several times deeper than the individual food pieces so that the application of a thin uniform coating on all sides of the pieces is difficult. In addition, these pieces of food product are generally highly frangible and must be handled in such a manner as to prevent or minimize breakage.

An important object of this invention is to provide an improved method and apparatus for applying powdered seasoning to pieces of food products in a thin uniform coating and which is particularly adapted for coating light weight and generally irregularly shaped pieces of food products such as potato chips, pop corn and the like in such a manner as to coat all sides of the pieces.

Another object of this invention is to provide a method and apparatus for applying a powdered seasoning to food products, in accordance with the foregoing object, which is adapted to season the pieces of food products when continuously fed thereto in a layer several times deeper than the individual food pieces to thereby effect seasoning of the food product at a rate commensurate with the rate of delivery of the food product from the processing apparatus.

A more particular object of this invention is to provide a method and apparatus for applying powdered seasoning to pieces of a food product in which the powdered seasoning is pneumatically suspended and circulated in a localized zone within the seasoning apparatus and the food pieces tumbled through this zone to be coated on all sides thereof with the suspended seasoning.

A further object of this invention is to provide a method and apparatus for applying powdered seasoning to light weight pieces of food products in which the pieces of food product are passed through a seasoning chamber and a localized zone of rapidly swirling air is provided in the chamber to blow the pieces of food products in the chamber and effect tumbling thereof and in which the powdered seasoning is fed into the zone of swirling air to be suspended therein and carried with the air to the food pieces for deposit on all sides thereof.

Yet another object of this invention is to provide an improved apparatus for applying powdered seasoning including a housing having an open inlet and outlet to permit the food products to be continuously passed therethrough and having an improved means for preventing the powdered seasoning in the housing from passing through the coated food products outlet, while permitting the passage of the food products therethrough.

An additional object of this invention is to provide an improved apparatus for feeding the powdered seasoning into the circulating air in the seasoning chamber.

These, together with various ancillary objects and advantages of this invention will be more readily appreciated as the same becomes better understood by reference to the following detailed description when taken in connection with the accompanying drawings wherein:

Fig. 5 is a fragmentary perspective view of the seasoning dispensing mechanism, with parts broken away and shown in section to illustrate details of construction.

The seasoning apparatus of the present invention is generally adapted for applying seasonings to a wide variety of food products such as potato chips, pop corn, Korn Kurls, etc. but is herein shown, for purpose of illustration, as treating potato chips with a powdered seasoning such as barbecue flavored seasoning.

Figure 1:
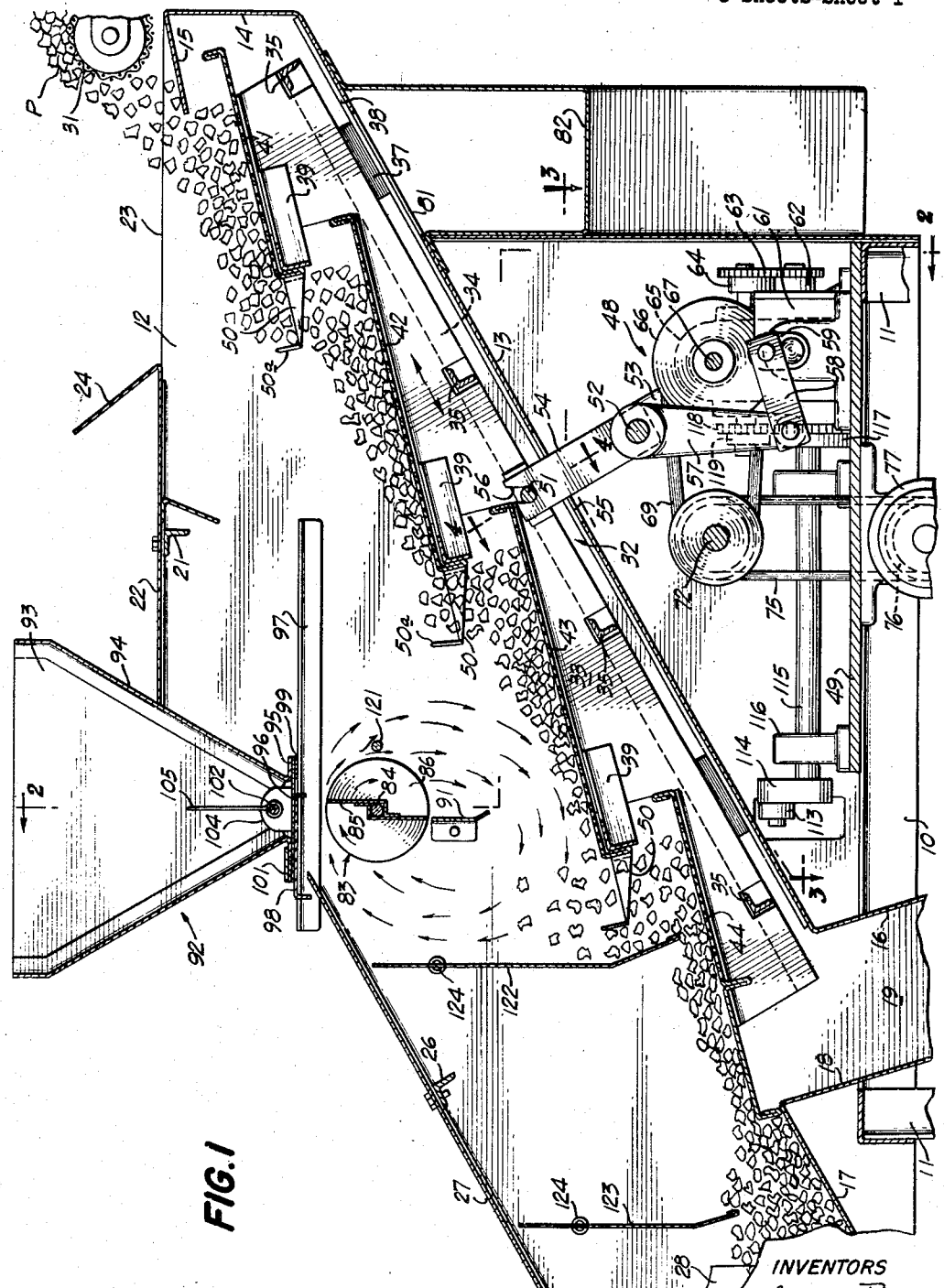
Figure 1 is a longitudinal sectional view through the seasoning apparatus.

The seasoning apparatus is mounted on a generally rectangular frame 10 which is supported on legs 11. The apparatus includes a housing having upstanding side walls 12 affixed to the frame 10 and a bottom wall 13 which extends between the side walls and is inclined downwardly and forwardly as best shown in Fig. 1. The upper end of the bottom wall 13 is bent upwardly to form a rear end panel 14 and bent downwardly and forwardly to provide a lip 15 on the upper end of the rear panel. The forward lower end of the bottom wall 13 is bent downwardly to form the rear wall 16 of a seasoning discharge chute. A panel 17 is affixed to the opposed side walls 13 and extends therebetween in a plane parallel to the bottom wall 13 and spaced thereabove to form, in effect, a continuation of the bottom wall. A panel 18 is formed on the rear end of the panel 17 and extends downwardly therefrom to form the forward wall of the seasoning discharge chute and relatively converging panels 19 are secured to the rear and forward panels 16 and 18 of the discharge chute to convey the seasoning to a central receptacle (not shown).

The sidewalls 12 are formed with a generally horizontally upper edge and an angle iron cross brace 21 is secured to the sidewalls adjacent the upper edges thereof. A horizontally disposed closure panel 22 is removably affixed to the cross piece 21 and extends between the side walls 12 and partially across the upper edge thereof to define a food products inlet 23 between the rear edge of the panel 22 and the lip 15. An upwardly and forwardly extending lip 24 is formed on the panel 22 to guide the food products into the inlet opening. The upper edge of the forward portion of the sidewalls 12 is inclined downwardly and forwardly in a direction generally parallel to the bottom wall 13 and an angle iron cross piece 26 is secured to the opposed side walls and extends therebetween. A front closure panel 27 is removably secured to the cross piece 26. A coated products discharge chute 28 is affixed to the forward open end of the housing to convey the coated pieces of food products therefrom.

Figure 4:
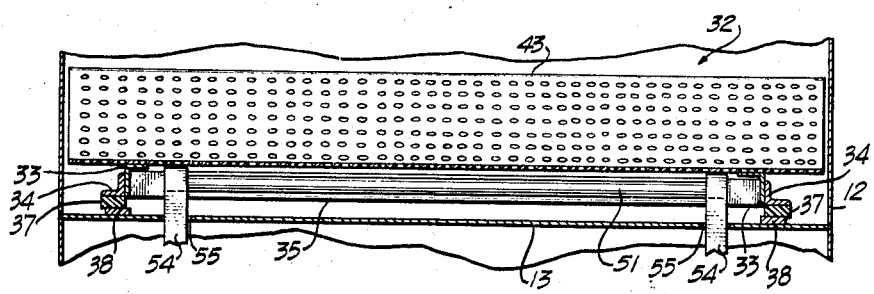
Fig. 4 is a fragmentary sectional view taken on the plane 4—4 of Fig. 1 and illustrating the stepped feed rack for advancing the pieces of food products through the seasoning apparatus.

The pieces of food products, such as the potato chips P, are fed into the inlet 23 in any desired manner such as by a conveyer 31 illustrated in Fig. 1 and which overlies the inlet 23. These potato chips are preferably delivered by the conveyer directly from the processing apparatus and while the chips are still warm and moist from the cooking oils so that the powdered seasoning will adhere readily to the surface of the chips. Obviously, if the potato chips or other food product is dry, as delivered to the seasoning apparatus, they may, if desired, be moistened with oil, steam or the like. Provision is made for supporting the food products in the housing and for advancing the same therethrough from the inlet 23 to the discharge chute 28. As best illustrated in Figs. 1 and 4, there is provided a stepped rack generally indicated by the numeral 32 and including spaced riser panels 33 disposed adjacent opposite sides of the housing and arranged to extend along the bottom wall 13 thereof. A reinforcing angle iron 34 is affixed to each riser panel and a plurality of cross pieces 35 are secured to the angle iron 34 and extend therebetween to form a supporting framework for the rack. The riser panels are slidably mounted on the bottom wall 13 of the housing and for this purpose a plurality of pads 37 are affixed to the angle irons 34 at longitudinally spaced points thereon and adapted to slidably engage the wear strips 38 which are affixed to the bottom wall 13. Generally U-shaped frames 39 formed of angle iron or the like are secured to each of the steps on the riser panel adjacent the upper edges thereof and extend between the spaced riser panels to rigidly secure the latter together. A plurality of perforate screens 41—44 are secured to the riser panels and extend therebetween to form steps, which steps as best illustrated in Fig. 1, are inclined downwardly and forwardly. A plurality of forwardly extending fingers 50 having upwardly extending projections 50a thereon are affixed to the forward edges of the screen members 41—43. These fingers are spaced apart a distance such that the potato chips P or other food products on the respective screen members are turned as they move off one screen member to the adjacent screen member and, preferably, the fingers on one screen are staggered with respect to the fingers on the adjacent lower screen to enhance turning of the food product.

The stepped rack is reciprocated along the bottom wall 13 of the housing to advance the pieces of food products from the inlet 23 to the discharge chute 28 and for this purpose there is provided a drive mechanism designated generally by the numeral 48 and which may conveniently be mounted below the bottom wall 13 of the housing. The drive mechanism is conveniently mounted on a base plate 49 which is affixed to the main frame 10.

Figure 2:
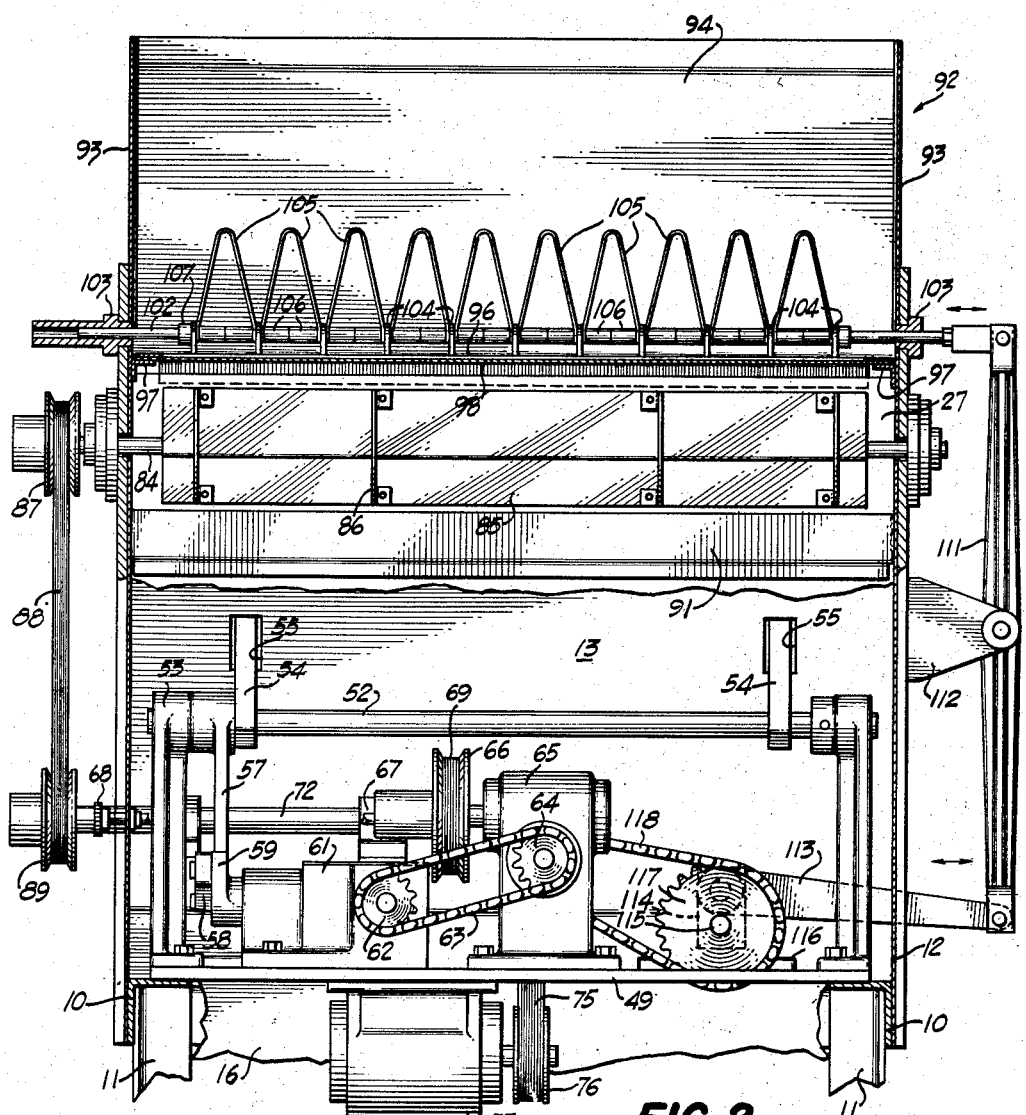
Fig. 2 is a transverse sectional view taken on the plane 2—2 of Fig. 1.
Figure 3:
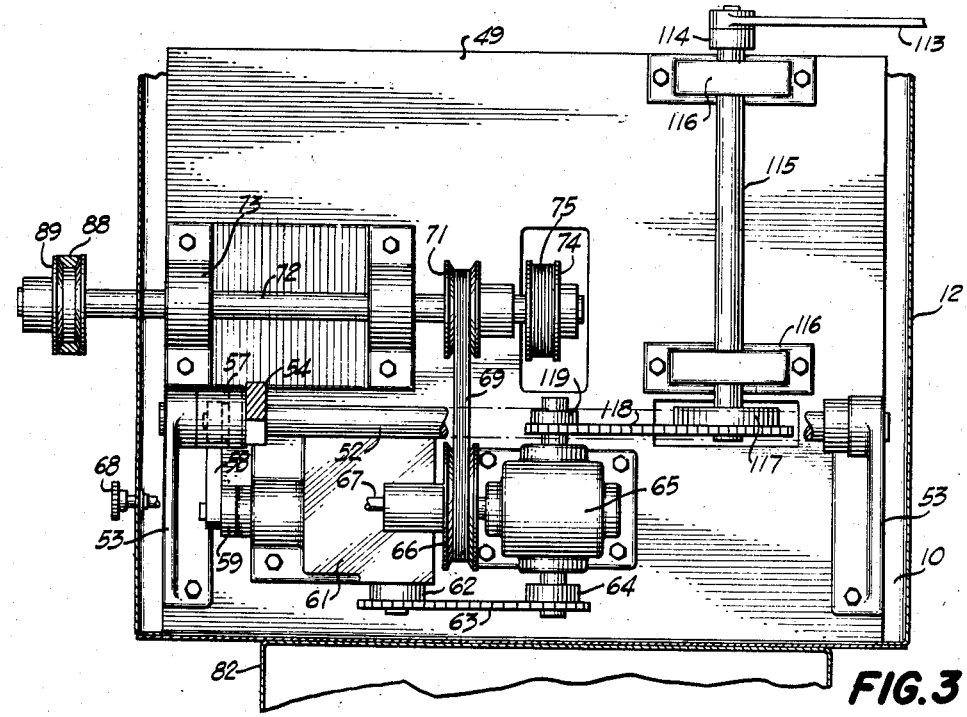
Fig. 3 is a sectional view taken just below the bottom of the seasoning chamber on the plane 3—3 of Fig. 1 and illustrating the drive mechanism.

Any suitable mechanism may be provided for effecting reciprocation of the rack 32 and in the embodiment herein illustrated, a cross bar 51 is affixed to the opposed riser panels 33 of the rack and extends therebetween. A rock shaft 52 is mounted on trunnions 53 carried by the base plate 49 and has spaced arms 54 affixed therethrough and adapted to extend through openings 55 in the bottom wall 33. The ends of the arms 54 are slotted as shown at 56 to receive the cross bar 51 and effect reciprocation of the rack in response to oscillation of the arms 54. A lever 57 is non-rotatably secured to the rock shaft and is connected at the free end thereof by a link 58 to crank 59. The crank 59 is affixed to the driven shaft of a gear mechanism 61, the drive shaft of which gear mechanism is connected by means of a sprocket 62 and chain 63 to the sprocket 64 on the driven shaft of a second gear mechanism 65. The gear mechanism 65 has a variable diameter pulley 66 mounted thereon which pulley is manually adjustable by means of a shaft 67 and knob 68 disposed externally of the housing. The pulley 66 is connected by a belt 69 and pulley 71 to the main drive shaft 72 which is journaled in bearings 73 on the upper side of the base plate. The main drive shaft is connected through a pulley 74 and belt 75 to the pulley 76 on the drive motor 77 mounted at the underside of the base plate, as is clearly shown in Figs. 1 and 2. The motor 77 is thus drivingly connected to the crank 59 which oscillates the rock shaft 52 through the link 58 and lever 57 to thereby effect cyclic reciprocation of the rack 32. Since the screens 41—44 are inclined downwardly and forwardly, the pieces of food products thereon are advanced through the housing at a rate determined by the rate of reciprocation of the rack. The speed of reciprocation of the rack can be selectively controlled by turning the knob 68 to adjust the variable diameter pulley 66 and thereby provide the desired rate of advance of the food products through the housing.

The potato chips P or other food product, as it is discharged from the conveyer into the seasoning apparatus, generally contains small broken pieces. For this reason, the upper screen 41 is formed with relatively large openings therein sufficient to permit the passage of the smaller broken pieces therethrough and provision is made for collecting these pieecs. As shown in Fig. 1, there is provided an opening 81 in the bottom wall 13 of the housing immediately below the upper screen and a transversely inclined chute 82 is affixed to the underside of the bottom wall 13 to convey the broken pieces to a suitable waste receptacle (not shown). The other screens 42—44 are formed with relatively smaller openings therein and arranged to permit the passage of excess seasoning powder therethrough, which seasoning powder falls on the bottom wall 13 and is conveyed thereby to the seasoning discharge chute formed at the lower end of the bottom wall.

The pieces of food product, as they are conveyed through the housing on the stepped rack, are in the form of a layer frequently several times deeper than the individual pieces. In order to properly coat the individual pieces with a powdered seasoning on all sides thereof, provision is made for pneumatically suspending the powdered seasoning in a localized zone within the housing and for tumbling the pieces of food products therethrough in such a manner as to individually expose each piece to the suspended seasoning powder and thereby uniformly coat the pieces on all sides. In order to minimize breakage of the relatively frangible pieces of food products, the tumbling is preferably effected or at least assisted by a stream of air so arranged as to move the pieces of food products on the rack as they pass through the suspended seasoning powder and thereby pneumatically effect tumbling of the food pieces.

In the embodiment illustrated, there is provided an elongated circulator 83 which extends completely across the housing above the rack 32. The circulator is preferably arranged to draw air from within the housing and discharge the air into the housing in such a manner as to provide a vertically circulating current of air which moves downwardly and then across the layer of food products on the rack 32 and in a direction to effect tumbling of the individual pieces toward the coated products discharge chute 28. The circulator 83 is mounted for rotation on a shaft 84 which extends transversely to the housing and has outwardly extending blades 85. Conveniently, a plurality of reinforcing disks 86 may be affixed to the blades at longitudinally spaced points thereon. The circulator 83 is rotated at a relatively high velocity, in a clockwise direction as viewed in Fig. 1, to produce the aforementioned vertically circulating current of air within the housing and effect tumbling of the food pieces therein. For this purpose, the shaft 84 is connected by means of a pulley 87 and belt 88 located externally of the housing to a pulley 89 on the main drive shaft 72 which, as previously described, is drivingly connected to the motor 77. The circulator 83 is mounted in the housing at a position spaced above the potato chips P or other food products on the rack 32 and a baffle 91 is mounted between the sidewalls 12 of the housing immediately below the circulator 83 to direct the air currents therefrom, illustrated by the arrows in Fig. 1, downwardly toward the food products on the rack.

The powdered seasoning is fed into the air stream produced by the circulator 83 to be carried with the air stream and spread thereby on to the food pieces as they are tumbled through the housing. Conveniently, the seasoning may be contained in a hopper designated generally by the numeral 92 which is mounted above the circulator 83 and arranged to discharge a controlled amount of powdered seasoning to the circulator along the entire length thereof. The specific hopper illustrated includes opposed end panels 93 formed integrally with the sidewalls 12 of the housing and downwardly and inwardly inclined side panels 94 which extend between the end panels and terminate at their lower ends in spaced relation to define a discharge chute immediately above the circulator 83. The lower ends of the side panels 94 are bent outwardly to form flanges 95 at the bottom of the hopper 92 and a screen 96 is arranged to underlie the flanges 95. As shown, a pair of longitudinally extending angle iron brackets 97 are affixed to the side walls 12 of the housing and underlie the flanges 95. A closure plate 98 is slidably mounted on the brackets 97 and underlies the screen 96, which closure plate is slidably adjustable to control the open area of the screen to thereby regulate the rate of discharge of powdered seasoning from the hopper 92. The screen 96 is removably mounted at the lower end of the hopper to facilitate cleaning and for this purpose, the rear edge of the screen 95 is spaced above the bracket 97 by a strip 99 which is affixed thereto and has a thickness equal to the thickness of the closure plate 98. The forward edge of the screen 96 is supported on the forward flange 95 of the hopper by means of a cleat 101.

Provision is made for agitating the seasoning in the hopper to provide a uniform discharge therefrom throughout the entire length of the hopper and for this purpose there is provided a shaker bar 102 which is reciprocably mounted in bearings 103 on the opposed end panels 93 of the hopper. The shaker bar has a plurality of scraper blades 104 affixed thereto and spaced longitudinally thereon, which scraper blades may be formed of a plastic or the like and extend downwardly into wiping engagement with the screen 96. The scraper blades prevent clogging of the screen 96 and a plurality of agitating fingers, herein shown in the form of bent wire loops 105, are affixed to the shaker bar 102 and extend upwardly into the hopper to agitate the powdered seasoning therein. For convenience of assembly, the loops 105 are formed with eyes on the ends thereof and the scraper blades have openings formed therein for receiving the shaker bar. The blades are interposed on the shaker bar between adjacent loops and spacing collars 106 are mounted on the shaker bar between the eyes on the loops 105. The assembled loops 105, wipers 104 and spacing collars 106 are affixed in position on the shaker bar by rings 107 located at opposite ends of the assembly.

The shaker bar 102 is reciprocated by a lever 111 which is pivotally connected at one end to the bar 102 and pivotally supported intermediate its ends on a bracket 112 affixed to the side wall of the housing. The lower end of the lever 111 is connected by a link 113 to a crank 114 carried by the crank shaft 115 that is journaled in bearings 116 on the base plate 49. A sprocket 117 is affixed to the crank shaft and connected by a chain 118 to a sprocket 119 on the gear mechanism 65 and is driven thereby from the motor 77.

The powdered seasoning is thus fed from the hopper 92 into the air stream produced by the circulator 83 at a rate controlled by the opening of the closure plate 98 at the bottom of the hopper and the speed of operation of the agitating mechanism in the hopper. As previously described, the powdered seasoning is carried with the circulating air stream produced by the circulator and is thus pneumatically suspended therein. It has been found, in practice, that the dispersion of the powdered seasoning in the air stream can be rendered more uniform by the provision of a cross bar 121 which extends across the housing adjacent the periphery of the circulator 83 and in the path of flow of the powdered seasoning as it is discharged from the circulator. The powdered seasoning impinges upon the cross bar 121 and is dispersed thereby in the air stream to be carried therewith.

The circulating stream of air within the housing produces some eddy currents within the housing which tend to carry some powdered seasoning out of the housing. In order to confine these eddy currents and prevent the seasoning from passing out through the open ends of the housing, the circulator is located within the housing at a level appreciably below the level of the food products inlet 23. With the circulator thus arranged and rotated in a clockwise direction as viewed in Fig. 1, it has been found, in practice, that a negligible amount of seasoning escapes through the inlet 23. In order to minimize the escape of seasoning through the food products outlet in the housing, there are provided a plurality of gates designated 122 and 123. These gates are swingably supported adjacent their upper ends by means of pintles 124 which are journaled in the sidewalls of the housing and extend downwardly from a point adjacent the forward closure panel 27 to a point spaced above the rack 32, as is clearly shown in Fig. 1. The gates normally assume a position such as shown in Fig. 1 substantially blocking flow through the upper part of the outlet housing. The food products P on the rack may pass below the gates while the powdered seasoning is confined in the upper part of the housing. The gates are arranged to be moved by engagement with the food products on the rack, to their dotted line positions shown in Fig. 1, sufficient to permit the passage of large quantities of the food products on the racks while substantially preventing the passage of seasoning from the upper portion of the housing to the coated food products outlet.

Operation

For convenience, the operation of the seasoning apparatus will be described in connection with the application of a powdered seasoning such as barbecue flavored seasoning to potato chips, it being apparent that the apparatus may, with slight variations in speed of operation of the circulator and rack, be adapted for coating pieces of food products having shape and weight characteristics different from potato chips. The potato chips, designated by the letter P, are continuously fed into the food products inlet 23 of the seasoning apparatus as by the conveyor 31 from the processing apparatus and preferably while still warm and moist with oils. The rack 32 is reciprocated and, since the screens 41—44 are inclined downwardly and forwardly, the food products are advanced through the housing from the inlet 23 to the discharge chute 28 at a rate determined by the speed of reciprocation of the rack. As previously described, the speed may be selectively adjusted by turning the knob 68 which controls the variable diameter pulley 66. The potato chips are disposed in a layer on the steps 41—44, the depth of which layer varies with the rate at which the potato chips are fed to the seasoning apparatus from the conveyer 31. In general, the potato chips are in a layer several times deeper than the individual chips and tumble from one step to the next succeeding step as they advance through the housing. The projecting fingers 50 on the forward ends of each of the steps 41—43 agitate and turn the chips as they tumble from one step to the succeeding step.

The circulator 83 is arranged for rotation in a clockwise direction as viewed in Fig. 1 and at a relatively high velocity to produce a vertically circulating current of air indicated by the arrows in Fig. 1. The powdered seasoning is fed into the circulator 83 at a rate determined by the opening of the valve member 98 and is carried with the air stream. It has been found in practice that the circulator 83, when rotating at a high velocity, tends to accelerate the powdered seasoning to an extent such that the heavier particles thereof move in a somewhat concentrated stream which strikes the food products on the rack at a point in advance of the point where the food products pass through the circulating current of air produced by the circulator. In order to reduce the velocity at which the seasoning is discharged from the circulator 83 and to disperse the seasoning so that it is carried more uniformly in the air stream, there is provided baffle 121, herein shown in the form of a round bar which extends across the housing in the path of discharge of the seasoning from the circulator. The baffle plate 91 is provided adjacent the lower periphery of the circulator for directing the circulating current of air downwardly toward the layer of potato chips on the stepped rack 32.

The circulating current of air produced by the circulator 83 flows downwardly toward the layer of food products on the step 83 and across the layer in the direction of movement thereof on the stepped rack, the air current then flowing upwardly toward the circulator 83. This rapidly moving current of air is sufficient to move the light weight pieces of potato chips along the stepped rack and effect tumbling thereof so that all sides of the chips are exposed to the air stream. Since the powdered seasoning is dispersed in and carried by the air stream, it is apparent that the potato chips will be uniformly coated thereby on all sides.

The gates 122 and 123 are swingably supported in the housing between the circulator 83 and the discharge opening therein and extend across the upper portion of the housing to a point spaced above the rack to permit the passage of the food products thereby while substantially closing the space in the housing above the layer of food products to prevent the flow of powdered seasoning through the seasoned products outlet.

As the stepped rack 32 oscillates, the small broken pieces of food products delivered to the seasoning device and deposited on the upper screen 41 pass through this screen and through the opening 81 in the bottom wall of the housing. These broken pieces are conveyed by the chute 82 to a waste receptacle (not shown). The stepped racks 42—44 are also perforated and permit the passage of excess powdered seasoning therethrough, which powdered seasoning is conveyed by the bottom wall 13 of the housing to the chute formed at the lower end of the housing. In this manner, the excess seasoning is collected separate from the broken pieces of food products and may be reused.

We claim:
1. The method of coating light weight pieces of food products with powdered seasoning comprising passing the food pieces along a support through a seasoning chamber, creating a zone of high air turbulence in the chamber above the support to agitate and move the pieces of food products relative to each other and along the support as they pass through the chamber and cause the pieces of food products to change position therein, and introducing the powdered seasoning into said zone for dispersion and circulation by the air turbulence.

2. The method of coating light weight pieces of food products with powdered seasoning comprising passing the food product in a layer several times deeper than the individual food pieces along a support through a seasoning chamber, producing a zone of rapidly swirling air in the chamber above the support sufficient to blow the food pieces along on the support and cause the food pieces to change positions thereon, and introducing the powdered seasoning into said zone of swirling air to be dispersed thereby and spread onto the food pieces as they are moved by the swirling air.

3. The method of coating light weight pieces of food products with powdered seasoning comprising advancing the food product at a preselected rate along a support through a seasoning chamber in a layer several times deeper than the individual food pieces, producing a zone of rapidly swirling air in the chamber above the support and which moves across the top of the layer in the direction of movement thereof and at a relatively higher rate sufficient to blow the individual food pieces along the support and cause the pieces to tumble and change position thereon, and introducing the powdered seasoning into said zone of swirling air to be dispersed thereby and spread onto the food pieces as they are moved by the swirling air.

4. The method of coating light weight pieces of food products with powdered seasoning comprising advancing the food product at a preselected rate along a support through a seasoning chamber in a layer several times deeper than the individual food pieces, producing a zone of vertically circulating air in the chamber above the support and which moves across the layer of food pieces in the direction of movement thereof and at a relatively higher rate sufficient to blow the individual food pieces along the support and cause the food pieces to tumble and change positions thereon, introducing the powdered seasoning into the vertically circulating air at a point therein where the air stream is moving opposite the direction of movement of the food pieces on the support, and dispersing the seasoning in the circulating air to produce a fine mist of seasoning in said circulating air to coat the pieces of food products as they move through said zone.

5. An apparatus for applying powdered seasoning to light weight pieces of food products comprising a housing having an inlet for receiving the food product to be seasoned and an outlet for discharging the seasoned food product, means in said housing for supporting the pieces of food products and for advancing the same through the housing from the inlet to the outlet, a blower mounted for rotation about a horizontal axis above the support and having longitudinally extending blades for producing a current of air in said housing above said support sufficient to blow the food pieces on the support and cause the food pieces to tumble and change positions thereon, and means for feeding powdered seasoning material onto the blades of said blower and into said current of air to be spread thereby on all sides of the food pieces as they tumble in said housing.

6. An apparatus for applying powdered seasoning to light weight pieces of food products comprising a housing having an inlet for receiving the food product to be seasoned and an outlet for discharging the seasoned food product, means in said housing for supporting the pieces of food products and for advancing the same through the housing from the inlet to the outlet, an elongated air circulator mounted in said housing for rotation about an axis transverse the direction of movement of the food pieces from said inlet to said outlet and spaced above said support, means for rotating said circulator at a high speed sufficient to produce a vertically circulating current of air in said housing which blows across said support means and tumbles the food pieces therealong, and means for feeding powdered seasoning material into said vertically circulating current of air to be spread thereby on all sides of the food pieces as they tumble in the housing.

7. An apparatus for applying powdered seasoning to light weight pieces of food products comprising a housing having an inlet for receiving the food product to be seasoned and an outlet for discharging the seasoned food product, means in said housing for supporting the pieces of food products and for advancing the same through the housing from the inlet to the outlet, air circulating means in said housing above said support and intermediate said inlet and said outlet for producing a rapidly swirling current of air sufficient to blow the food pieces along the support means and cause the food pieces to tumble and change positions thereon, means for feeding powdered seasoning material into said swirling current of air to be spread thereby on all sides of the food pieces as they tumble in said housing, and a gate mounted in said housing between said air circulating means and said outlet and extending completely thereacross, said gate extending downwardly to a point adjacent said support means to confine said swirling air current carrying said seasoning material and prevent the passage thereof to said outlet, said gate being mounted on said housing for vertical swinging movement to open in response to engagement by said food pieces on the support to permit the passage of said food pieces to said outlet.

8. An apparatus for applying powdered seasoning to light weight pieces of food products comprising an elongated housing having an inlet adjacent one end thereof and an outlet adjacent the other end spaced below said inlet, an inclined rack in said housing for supporting the food product and for advancing the same from said inlet to said outlet, air circulating means mounted in said housing above said rack and located below said inlet and above said outlet for producing a vertically circulating current of air in said housing, means for feeding powdered seasoning material into said circulating stream of air to be circulated therewith, and a gate extending across said housing between said air circulating means and said outlet and extending downwardly therein to a point adjacent said rack to confine said air stream and prevent the passage thereby of air currents containing said seasoning material, said gate being mounted on said housing for vertical swinging movement to open in response to engagement by the food pieces on said rack and permit the passage of said food pieces to said outlet.

9. An apparatus for applying powdered seasoning to light weight pieces of food products comprising a housing having an inlet adjacent one end thereof and an outlet adjacent the other end spaced below said inlet, a stepped rack inclined downwardly from said inlet to said outlet for supporting the pieces of food product thereon as it passes through said housing, means for oscillating said rack to advance the pieces of food products thereon through said housing and for effecting tumbling of said pieces from one step to the adjacent lower step, air circulating means mounted in said housing above said rack for producing a rapid vertically circulating current of air extending completely across said rack for blowing the food pieces along said rack to effect tumbling of the food pieces thereon, and means for feeding powdered seasoning material to said air circulating means to be dispersed thereby into said circulating air stream for coating the food pieces as they tumble in said housing.

10. The combination of claim 9 including a plurality of spaced fingers attached to each of the steps on said racks adjacent the edge thereof remote from said inlet for engaging the pieces of food product as they tumble from one step to the next succeeding step to agitate the food pieces.

11. The combination of claim 9 including a baffle disposed in said housing in the path of movement of the powdered seasoning discharged from said air circulating means to disperse the seasoning in said circulating air stream.

12. The combination of claim 9 wherein said means for feeding seasoning comprises a hopper mounted above said air circulator and having a discharge opening extending completely across said housing.

13. An apparatus for applying powdered seasoning to light weight pieces of food products comprising a housing having an inlet adjacent one end and an outlet adjacent the other end, means in said housing for supporting the pieces of food product and for advancing the same from said inlet to said outlet, an air circulator in said housing extending thereacross above said supporting means for producing a vertically circulating current of air in said housing, a hopper feeding powdered seasoning mounted above said circulator and having a discharge opening extending throughout the length of said circulator, a screen extending across the discharge opening in said hopper, a plurality of wipers mounted in said hopper and engageable with said screen, and means for reciprocating said wipers longitudinally of said screen to dispense the powdered seasoning from said hopper into said fan.

14. The combination of claim 13 including agitating fingers operatively connected to said wipers for movement therewith and extending upwardly in said hopper.

15. An apparatus for applying powdered seasoning to food products comprising a housing having an inclined bottom wall, upstanding side walls and panels overlying the upper edges of said side walls and defining an inlet adjacent the upper end of said bottom wall and an outlet adjacent the lower end of said bottom wall, a stepped rack reciprocably mounted on said bottom wall and including a plurality of screen members extending across said housing between said side walls, means for reciprocating said rack to advance a layer of food products through the housing, a waste products discharge opening formed in said bottom wall adjacent the upper end thereof for receiving the broken pieces of food products which pass through the screen member at the upper end of the rack, means located intermediate the ends of said housing for spreading seasoning on the food products on said rack, and a discharge opening formed in said bottom wall adjacent the lower end thereof for receiving the excess seasoning which passes through the lower screen members on said rack.

References Cited in the file of this patent

UNITED STATES PATENTS

| | | |
|---|---|---|
| 1,283,512 | Herr | Nov. 5, 1918 |
| 1,725,608 | Zebulske | Aug. 20, 1929 |
| 1,910,536 | Guggenheim | May 23, 1933 |
| 2,347,164 | Petrilli | Apr. 18, 1944 |
| 2,451,096 | Kooman | Oct. 12, 1948 |
| 2,666,410 | Budny | Jan. 19, 1954 |